Figure 1:
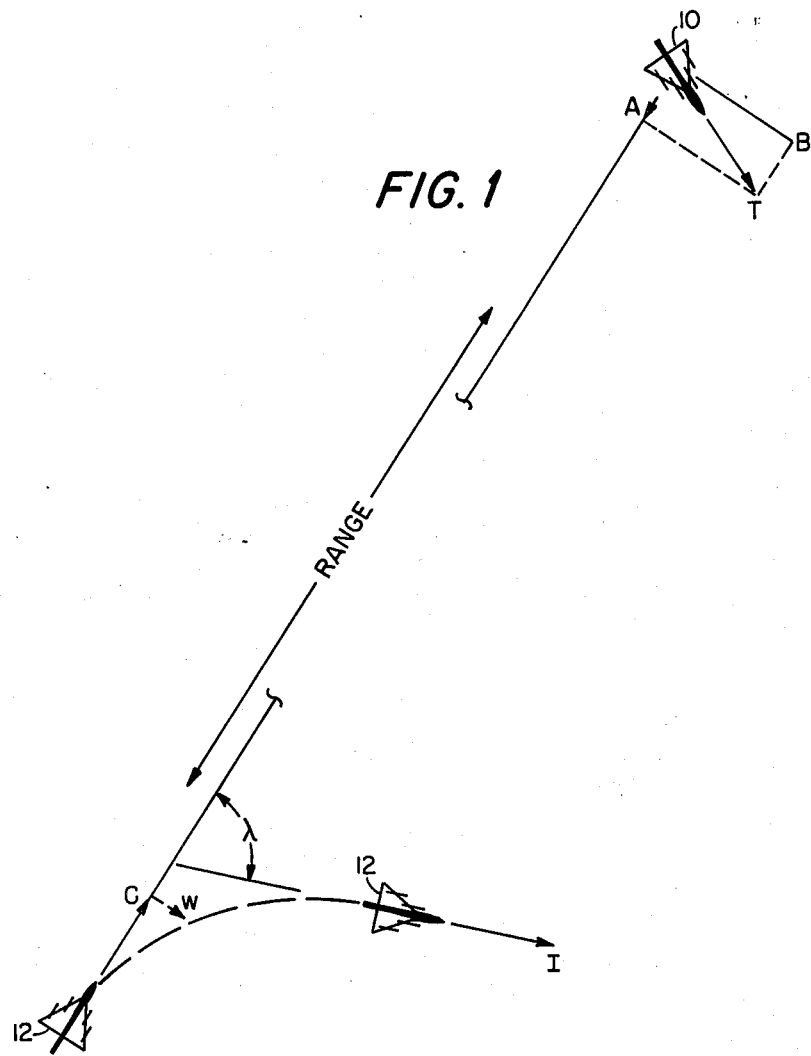

//
United States
Schmookler

3,906,189

[45] Sept. 16, 1975

[54] PASSIVE RANGE COMPUTER

[76] Inventor: Michael Schmookler, 5913 Eastern Ave., Hyattsville, Md. 20782

[22] Filed: July 15, 1965

[21] Appl. No.: 473,570

[52] U.S. Cl..... 235/61.5 S; 235/61.5 E; 235/150.27
[51] Int. Cl................................................ G06g 7/80
[58] Field of Search ..... 235/61.5 A, 61.5 B, 61.5 E, 235/61.5 R, 186, 150.27

[56] References Cited
UNITED STATES PATENTS

| | | | |
|---|---|---|---|
| 3,185,817 | 5/1965 | Shelley | 235/61.5 R |
| 3,206,143 | 9/1965 | Von Munchhofen | 235/61.5 R |
| 3,260,478 | 7/1966 | Welti | 235/61.5 R |

*Primary Examiner*—Maynard R. Wilbur
*Assistant Examiner*—H. A. Birmiel
*Attorney, Agent, or Firm*—R. S. Sciascia; Arthur L. Branning

[57] ABSTRACT

A method and apparatus whereby an interceptor pilot can compute the range of an object when the ranging, but not the detecting and tracking, capability of the interceptor's radar is destroyed by countermeasures. The computer of the invention determines target range from the speed of the interceptor, the rate of turning while on a line of sight heading and the angle between the line of sight and lead collision courses.

9 Claims, 2 Drawing Figures

PASSIVE RANGE COMPUTER

The invention described herein may be manufactured and used by or for the Government of the United States of America for governmental purposes without the payment of any royalties thereon or therefor.

The present invention relates to an object locating system and method and more particularly to a method and a computing device whereby an interceptor pilot can determine the range of a moving aerial target when his only knowledge of the target is its direction relative to his interceptor.

It is imperative in many situations that, in addition to detecting an object that is a potential enemy target, the pilot of an interceptor aircraft also know the range of the object. Normally this range information is readily available from the interceptor's radar. However, countermeasures may exist which would destroy the ranging capability, but not the detecting and tracking capability, of the interceptor's radar. In such an event, prior to the present invention, the functional effectiveness of the interceptor would be severely limited.

The general purpose of this invention is to provide a method and a computing device whereby an interceptor pilot, having detected an object that is a potential enemy target, is able to determine the range of the target even though countermeasures have destroyed the ranging, but not the detecting and tracking, capability of the interceptor's radar. To obtain the desired target range information, the invention contemplates that the interceptor pilot will make certain maneuvers which will provide information that, together with other information which is available to the pilot, is manipulatively inserted into a computing device that produces an output indicative of the range of the target.

It is therefore an object of this invention to provide a method and apparatus for computing the range of a distant object.

Another object is to provide a method and a computing device whereby an interceptor pilot is able to determine the range of a target.

Yet another object of the present invention is the provision of a method consisting of certain information-obtaining aeronautical maneuvers and a computing device for utilizing this information whereby the pilot of an interceptor can determine the range of a moving target even though the ranging capability of the interceptor's radar is destroyed by countermeasures.

Figure 2:
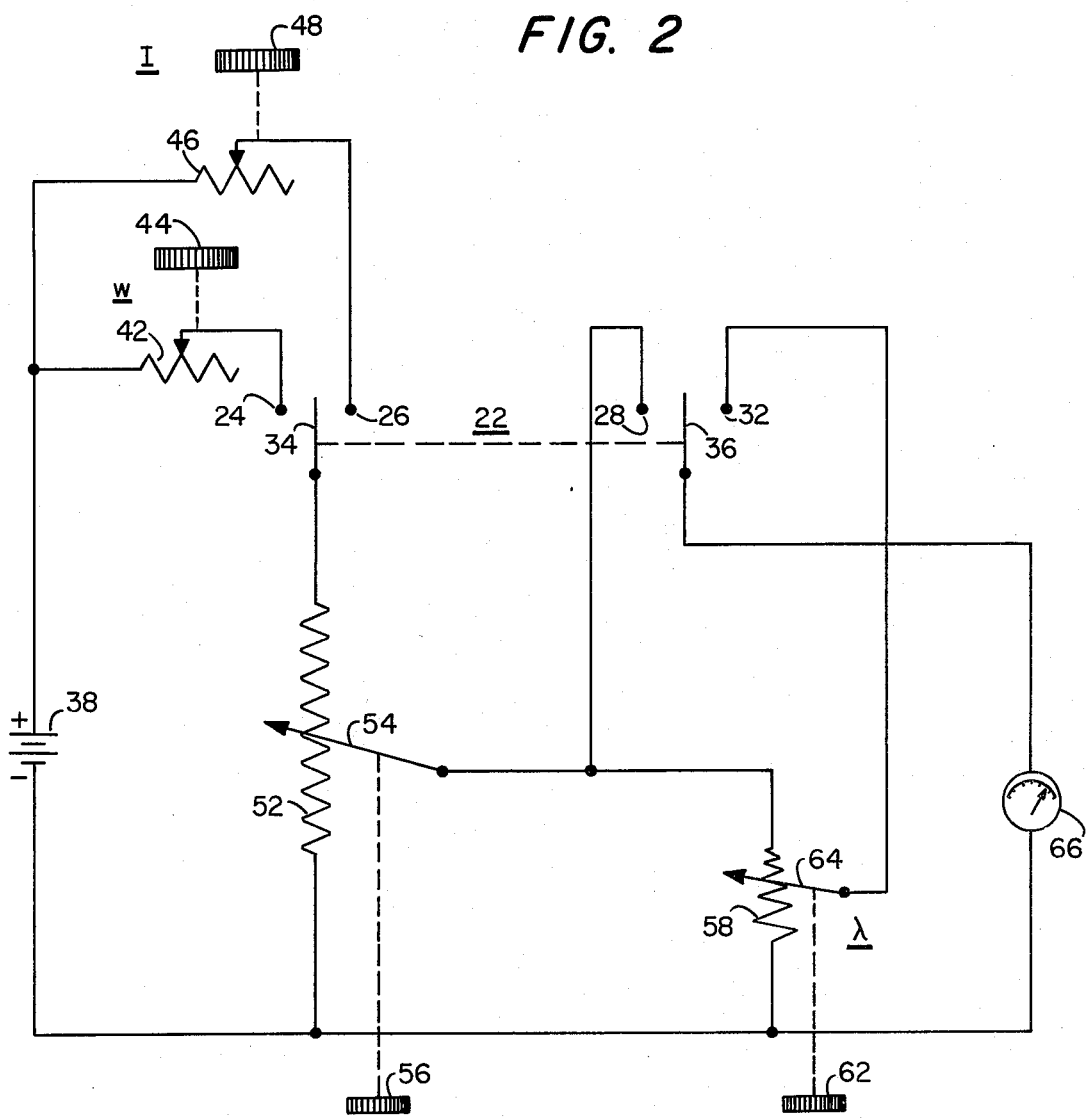

The exact nature of this invention as well as other objects and advantages thereof will be readily apparent from consideration of the following specification relating to the annexed drawings in which:

FIG. 1 is a vector diagram which is helpful in understanding the method of the invention and FIG. 2 is a circuit diagram of the computing device of the invention.

Referring now to the drawings, there is shown in FIG. 1 an object 10, a potential enemy target, which is moving with a velocity represented by the vector T having quadrature components A and B relative to an interceptor aircraft 12. Enemy electronic counter-measures have partially disabled the interceptor's radar to the extent that the radar's ranging, but not its detecting and tracking, capability has been destroyed. Under such circumstances it is of the utmost importance that the pilot of interceptor 12 be able to determine the range of the moving object 10.

According to the method of this invention the interceptor pilot will first maneuver his aircraft to be pointed directly at, that is on a line of sight heading C with, the object 10 and at this time ascertain from cockpit instruments the heading C and the rate of change $w$ of the heading C. The pilot of interceptor 12 will next maneuver his aircraft to be on a constant true bearing or lead collision course (schematically represented by vector I) with object 10. At this time the pilot will ascertain the interceptor aircraft's speed and direction, the latter defining the angle $\lambda$ with respect to the heading C.

In the light of the above, the following analysis can be made. When the interceptor 12 is on a line of sight heading C with the object 10, the relationship exists that:

$$(1) \quad \text{Range} = \frac{B}{w}$$

When the interceptor is on the lead collision course I with the object, the relationship exists that:

$$(2) \quad I \cdot \sin\lambda = B$$

Combining Equations (1) and (2) produces:

$$(3) \quad \text{Range} = \frac{I \cdot \sin\lambda}{w}$$

It is this equation, ie. Equation (3), which the computing device of the invention, described below and illustrated in FIG. 2, solves to produce an output representative of the range or distance of target 10 from interceptor 12. In Equation (3), it will be noted, the terms of the right hand side of the equation are known, either explicitly or by trigonometric relationship, from the described line of sight and lead collision course maneuvers; the term I being the interceptor's velocity in the collision course, the term $w$ being the angular rate of turn in the line of sight course and $\lambda$ being the angle of turning from the line of sight to the lead collision course. Thus Equation (3) makes it possible for a pilot to determine the range of a moving target even though only the relative bearing of the target is known. The value for $w$ is obtained by flying a pure pursuit course and measuring the interceptor's own rate of turning while on this course. The values I and $\lambda$ are obtained by flying a constant bearing course (that is a course which keeps the target at a constant bearing relative to the interceptor) and measuring interceptor's own velocity and target bearing.

Referring now to FIG. 2, switch 22 is a double pole, double throw switch having contacts 24, 26, 28 and 32 and blades 34 and 36. A source of potential, such as a battery 38, is connected to contact 24 through a variable resistance 42, the operable size of which is controlled by knob 44. Source 38 is also connected to contact 26 through a variable resistance 46, the operable size of which is controlled by knob 48. These variable resistances in conjunction with battery 38 form convenient means for applying variable potentials to blade 34. The potentials, representing velocity and turning rate, may already be available in the interceptor and in such a case they need not be specially generated. Blade 34 is connected to one end of linear potentiometer 52, the other end of which is connected to the reference potential side of source 38. Wiper 54 of potentiometer 52 is positioned by knob 56 and is connected both to contact 28 and to one end of the sinusoidal potentiometer 58, the other end of which is connected to the reference potential side of source 38. Knob 62 mechanically controls the position of the wiper 64 of sinusoidal potentiometer 58. Wiper 64 is connected to contact 32. Voltmeter 66 is connected between blade 36 and the reference potential side of source 38.

The procedure for using the computing device of FIG. 2 is as follows. While on the line of sight course C, the pilot first throws switch 22 so that blades 34 and 36 engage contacts 24 and 28 and then adjusts knob 44, which is calibrated, to the value of w, the angular rate of turning. The pilot then adjusts potentiometer 52, by means of knob 56, until the voltmeter 66 reads a predetermined reference value. With blade 34 in its left position, the voltage on wiper 54 is related to the voltage on blade 34 by the voltage divider ratio $V_{54}/V_{34}$; where, $V_{54}$ is the voltage on wiper 54 and $V_{34}$ is the voltage on blade 34. Since wiper 54 has been adjusted until $V_{54}$ equals a predetermined constant and knob 44 has been adjusted to a value directly related to w, it can be seen that this causes potentiometer 52 to become a voltage divider in which the divisor is related to w.

After maneuvering the interceptor 12 into a lead collision course with object 10, the pilot next throws switch 22 so that blades 34 and 36 engage contacts 26 and 32 and then adjusts potentiometer 46, by means of calibrated knob 48, to the value I, the velocity in the constant true bearing or lead collision course. Finally, the pilot of the interceptor 12 manipulates calibrated knob 62 to the value of λ, the angle of turning from the line of sight to the lead collision course, and thereby positions wiper 64 on the sinusoidal resistance 58. At this time the calibrated voltmeter 66 will indicate the approximate range of the object 10 from the interceptor 12.

It will now be apparent that there has been disclosed both a method which includes making certain information-obtaining maneuvers and a computing device for utilizing this information whereby the pilot of an interceptor can determine the range of a moving target even though the ranging, but not the detecting and tracking, capability of the interceptor's radar is destroyed by countermeasures.

Obviously many modifications and variations of the present invention are possible in the light of the above teachings. For example, the potentials at the contacts 24 and 26 which are representative of the quantities w and I are usually available within, and may be obtained from, the tracking or other portions of the interceptor's radar system. Similarly, the manual control knob 62 may be replaced either by a direct mechanical connection to the radar antenna or by a servo control coordinated with the movement of the antenna. Yet another obvious variation is to replace the sinusoidal potentiometer 58, 62, 64 with a fixed resistor representative of the sine of a fixed value of λ and for the pilot to turn a fixed angle and vary the speed I to obtain the lead collision course.

It is therefore to be understood that only a preferred embodiment of the invention has been disclosed and that various modifications are contemplated and may obviously be resorted to by those skilled in the art without departing from the spirit and scope of the invention, as hereinafter defined by the appended claims.

What is claimed and desired to be secured by Letters Patent of the United States is:

1. A method whereby a pilot of a vehicle determines the range of an object comprising the steps of:
    Maneuvering said vehicle into a line of sight course with said object and obtaining the rate of turning w while in said line of sight course;
    Turning said vehicle through an angle λ to be in a lead collision course with said object and obtaining the velocity I while in said lead collision course and
    Computing the range of said object from the quantities w, λ and I obtained while maneuvering said vehicle in said line of sight and lead collision courses.

2. The method set forth in claim 1 wherein said computing of range is by the formula $$\text{Range} = \frac{I \cdot \sin \lambda}{w}$$

3. A computing device comprising:
    A double pole, double throw switch having two blades and a pair of contacts operatively associated with each of said two blades;
    A common reference point;
    A linear potentiometer having a wiper and being connected between one of said two blades and said common reference point;
    A voltmeter connected between the other of said two blades and said common reference point;
    A sinusoidal potentiometer having a wiper and being connected at one end to said common reference point and
    Circuit means connecting the other end of said sinusoidal potentiometer to said wiper of said linear potentiometer and to one of said pair of contacts operatively associated with the other of said two blades and connecting said wiper of said sinusoidal potentiometer with the other of said pair of contacts operatively associated with the other of said two blades.

4. A device for computing the range of a moving distant object relative to an interceptor aircraft comprising:
    Voltage producing means for producing a voltage I proportional to said aircraft's velocity when upon a lead collision course with said object;
    Voltage dividing means connected to receive said voltage I for dividing said voltage I by a factor w, proportional to said aircraft's rate of turning when upon a line of sight heading with said object, said voltage dividing means thereby producing an output voltage I/w and
    Voltage multiplying means connected to receive said I/w voltage for multiplying said voltage I/w by a factor sin λ where λ is the angle between said lead collision course and said line of sight heading, said voltage multiplying means thereby producing an output proportional to the range of said object.

5. A device as set forth in claim 4 and further including indicator means connected to receive the output voltage of said voltage multiplying means and to indicate the range of said object.

6. A device as set forth in claim 5 wherein said voltage dividing means includes a linear potentiometer.

7. A device as set forth in claim 6 wherein said voltage multiplying means includes a sinusoidal potentiometer.

8. A device as set forth in claim 7 wherein said linear and sinusoidal potentiometers each include adjustable wipers which respectively produce the output voltages of said voltage dividing and said voltage multiplying means.

9. A computing device for determining the range of a moving distant object relative to an interceptor aircraft comprising:
- A double pole, double throw switch having two blades and a pair of contacts operatively associated with each of said two blades;
- $w$ voltage producing means connected to one of said pair of contacts operatively associated with the first of said two blades for producing a voltage $w$ proportional to the rate of turning of said aircraft when upon a line of sight heading with said object;
- $I$ voltage producing means connected to the other of said pair of contacts operatively associated with the first of said two blades for producing a voltage $I$ proportional to the velocity of said aircraft when upon a lead collision course with said object;
- A common reference point;
- A linear potentiometer having an adjustable wiper and being connected between the first of said two blades and said common reference point;
- A voltmeter connected between the other of said two blades and said common reference point;
- A sinusoidal potentiometer having an adjustable wiper and being connected at one end to said common reference point and
- Circuit means connecting the other end of said sinusoidal potentiometer to said wiper of said linear potentiometer and to one of said pair of contacts operatively associated with the other of said two blades and connecting said wiper of said sinusoidal potentiometer with the other of said pair of contacts operatively associated with the other of said two blades.

* * * * *